(12) United States Patent
McClintock et al.

(10) Patent No.: US 9,233,651 B2
(45) Date of Patent: Jan. 12, 2016

(54) INTERIOR AUTOMOTIVE PANELS AND METHOD OF MAKING THEREOF

(76) Inventors: Steven D. McClintock, South Lyon, MI (US); Michael A. West, Howell, MI (US); Ryan Robert Case, Pinckney, MI (US)

( * ) Notice: Subject to any disclaimer, the term of this patent is extended or adjusted under 35 U.S.C. 154(b) by 52 days.

(21) Appl. No.: 13/582,825

(22) PCT Filed: Mar. 7, 2011

(86) PCT No.: PCT/US2011/027348
§ 371 (c)(1),
(2), (4) Date: Sep. 5, 2012

(87) PCT Pub. No.: WO2011/109800
PCT Pub. Date: Sep. 9, 2011

(65) Prior Publication Data
US 2012/0326467 A1    Dec. 27, 2012

Related U.S. Application Data

(60) Provisional application No. 61/310,985, filed on Mar. 5, 2010.

(51) Int. Cl.
*B60R 13/02* (2006.01)
*B29C 45/14* (2006.01)
*B29L 31/30* (2006.01)

(52) U.S. Cl.
CPC ................. *B60R 13/02* (2013.01); *B29C 45/14* (2013.01); *B29L 2031/3041* (2013.01); *B60R 13/0243* (2013.01); *B60R 2013/0281* (2013.01)

(58) Field of Classification Search
CPC ...... B60R 13/02; B60R 13/0243; B29C 45/14
USPC ........................................... 296/146.7; 49/502
See application file for complete search history.

(56) References Cited

U.S. PATENT DOCUMENTS 3,661,657 A * 5/1972 Wong ............................ 148/439
5,401,449 A 3/1995 Hill et al.
(Continued)

FOREIGN PATENT DOCUMENTS

WO    WO-03066304 A1    8/2003

OTHER PUBLICATIONS

International Search Report for application No. PCT/US2011/027348 dated Jun. 15, 2011.
(Continued)

*Primary Examiner* — Jason S Morrow
(74) *Attorney, Agent, or Firm* — Albert Bordas, P.A.

(57) ABSTRACT

A method of making an interior automotive panel. The method includes placing at least one three dimensional panel component on a first mold component having a mold surface shaped to form the exterior surface of the interior automotive panel. The at least one three-dimensional panel component has an exterior surface in contact with the mold surface. The method includes registering a registration feature of the at least one three-dimensional panel component with a groove defined by the mold surface of the first mold component and positioning a second mold component in registered communication with the first mold component. Together the first and second mold components define a void in the shape of the interior automotive panel. The method includes injecting resin into the void and removing a formed interior automotive panel from the first and second molds, the interior automotive panel having multiple surfaces of different surface qualities.

28 Claims, 5 Drawing Sheets

(56) References Cited

U.S. PATENT DOCUMENTS

| | | | |
|---|---|---|---|
| 5,582,789 A * | 12/1996 | Stein et al. | 264/46.4 |
| 6,183,038 B1 * | 2/2001 | Hansen et al. | 296/146.7 |
| 6,958,190 B2 | 10/2005 | Gardner, Jr. | |
| 2002/0066972 A1 | 6/2002 | Fritsch | |
| 2002/0079605 A1 * | 6/2002 | Pearson et al. | 264/46.4 |
| 2005/0140167 A1 * | 6/2005 | Jaggi | 296/146.7 |
| 2006/0008624 A1 | 1/2006 | Cowelchuk et al. | |
| 2006/0097545 A1 * | 5/2006 | Cowelchuk et al. | 296/146.7 |
| 2006/0154027 A1 * | 7/2006 | Dry | 428/138 |
| 2007/0069548 A1 * | 3/2007 | Dooley et al. | 296/146.7 |
| 2012/0256345 A1 * | 10/2012 | Smith et al. | 264/279 |

OTHER PUBLICATIONS

International Preliminary Report on Patentability dated Sep. 11, 2012, relating to International Application No. PCT/US2011/027348.

* cited by examiner

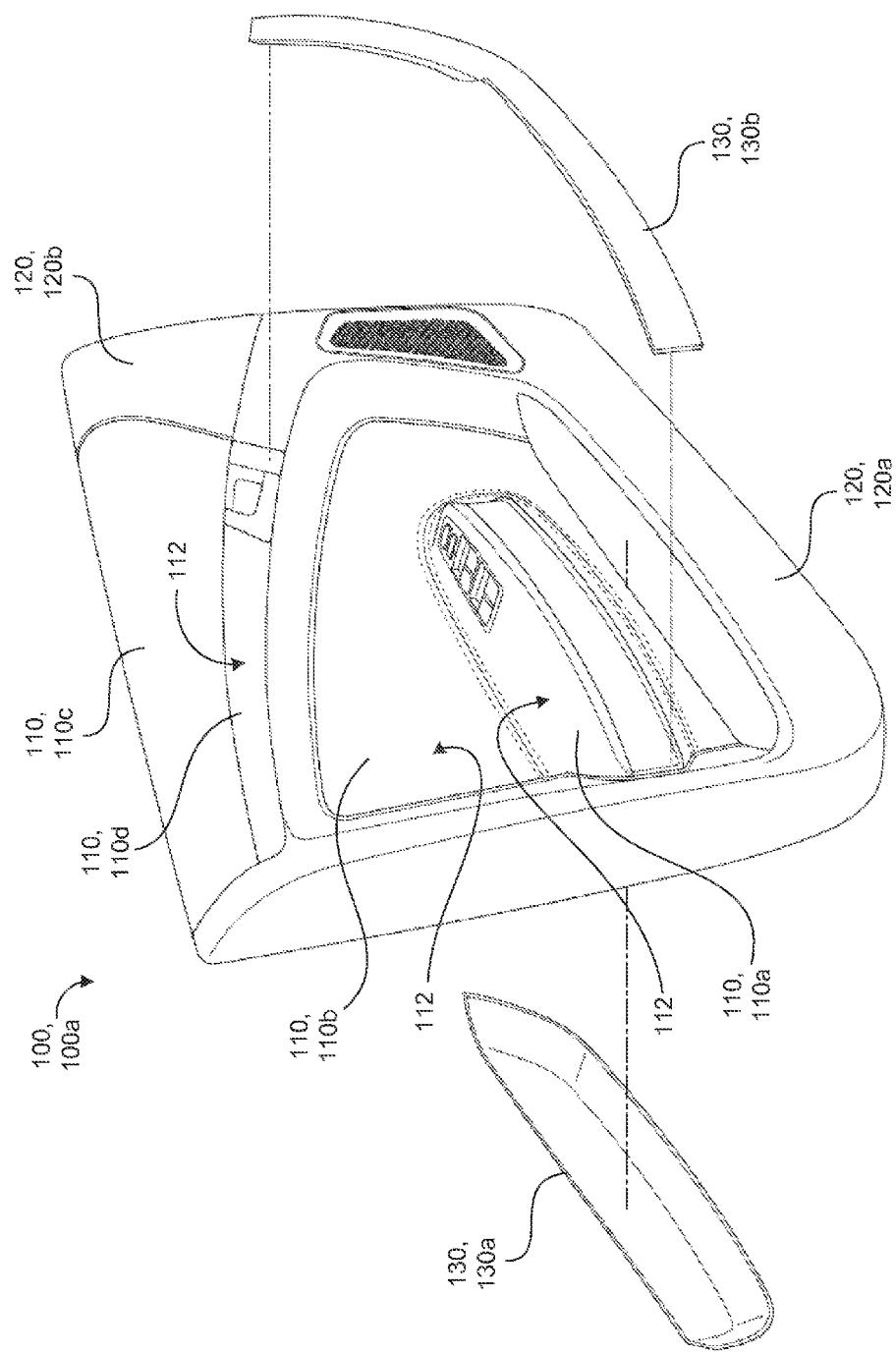

INTERIOR AUTOMOTIVE PANELS AND METHOD OF MAKING THEREOF

TECHNICAL FIELD

This disclosure relates to interior automotive panels and methods of making thereof.

BACKGROUND

Vehicles generally have automotive panels covering structure elements and/or providing interior decoration. Automotive door panels are often constructed of a combination of panels which are separately assembled and then brought together to form a complete door panel. Typically a base door panel is fabricated, as by injection molding, and various components (e.g., door handles, trim, etc.) are attached to the base door panel. The assembly usually requires several secondary processes that include assembly and trimming of the components.

SUMMARY

One aspect of the disclosure provides, a method of making an interior automotive panel. The method includes placing at least one three dimensional panel component on a first mold component having a mold surface shaped to form the exterior surface of the interior automotive panel. The at least one panel component has an exterior surface in contact with the mold surface. The method includes registering a registration feature of the at least one panel component with a groove defined by the mold surface of the first mold component and positioning a second mold component in registered communication with the first mold component. Together the first and second mold components define a void in the shape of the interior automotive panel. The method includes injecting resin into the void and removing a formed interior automotive panel from the first and second molds, the interior automotive panel having multiple surfaces of different surface qualities.

Implementations of the disclosure may include one or more of the following features. In some implementations, the method includes fixing the at least one panel component to the first mold component. The at least one panel component can be fixed to the first mold component by applying a static charge to the at least one panel component. The static charge causes the at least one panel component to substantially statically cling to the first mold component. In some examples, the at least one panel component is fixed to the first mold component by adhering the at least one panel component to the first mold component. An adhesive conducive to injection molding processes may be used.

In some implementations, the registration feature of the panel component includes at least one of an exterior surface perimeter of the panel component and an edge of the panel component. The method may include substantially sealing the exterior surface perimeter of the at least one panel component to the mold surface. In some examples, the method includes injecting the resin with a threshold pressure to push the registration feature of the panel component into substantially sealing engagement with the mold surface groove. Moreover, the groove may be configured to inhibit or impede flow of injected resin between an exterior surface of the panel component and the mold surface of the first mold component.

The method may include forming at least one molded component integrally attached to the at least one panel component. Together the at least one molded component and the at least one panel component define at least a portion of the formed interior automotive panel. The surface qualities may include at least one of material type, hardness, and color.

Another aspect of the disclosure provides an interior automotive panel that includes a molded portion and at least one three-dimensional panel component having a surface quality unlike the molded portion. The molded portion is formed about and joined to at least one panel component by placing the at least one panel component on a first mold component having a mold surface shaped to form the exterior surface of the interior automotive panel. The at least one panel component has an exterior surface in contact with the mold surface. A registration feature of the at least one panel component is registered with a groove defined by the mold surface of the first mold component. A second mold component is positioned in registered communication with the first mold component. Together the first and second mold components define a void in the shape of the interior automotive panel. Resin is injected into the void and a formed interior automotive panel is removed from the first and second molds. The formed interior automotive panel has multiple surfaces of different surface qualities.

Implementations of the disclosure may include one or more of the following features. In some implementations, the at least one panel component is fixed to the first mold component. The at least one panel component is fixed to the first mold component by applying a static charge to the at least one panel component. The static charge causes the at least one panel component to substantially statically cling to the first mold component. In some examples, the at least one panel component is fixed to the first mold component by adhering the at least one panel component to the first mold component.

In some implementations, the registration feature of the panel component includes at least one of an exterior surface perimeter of the panel component and an edge of the panel component. The exterior surface perimeter of the at least one panel component may be substantially sealed to the mold surface. In some examples, the resin is injected into the first and second mold components with a threshold pressure to push the registration feature of the panel component into substantially sealing engagement with the mold surface groove. The groove may be configured to inhibit a flow of injected resin between an exterior surface of the panel component and the mold surface of the first mold component. Moreover, the surface qualities comprise at least one of material type, hardness, and color.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2B is a partial exploded view of the interior automotive door panel of FIG. 2A.

Like reference symbols in the various drawings indicate like elements.

DETAILED DESCRIPTION

Figure 1:
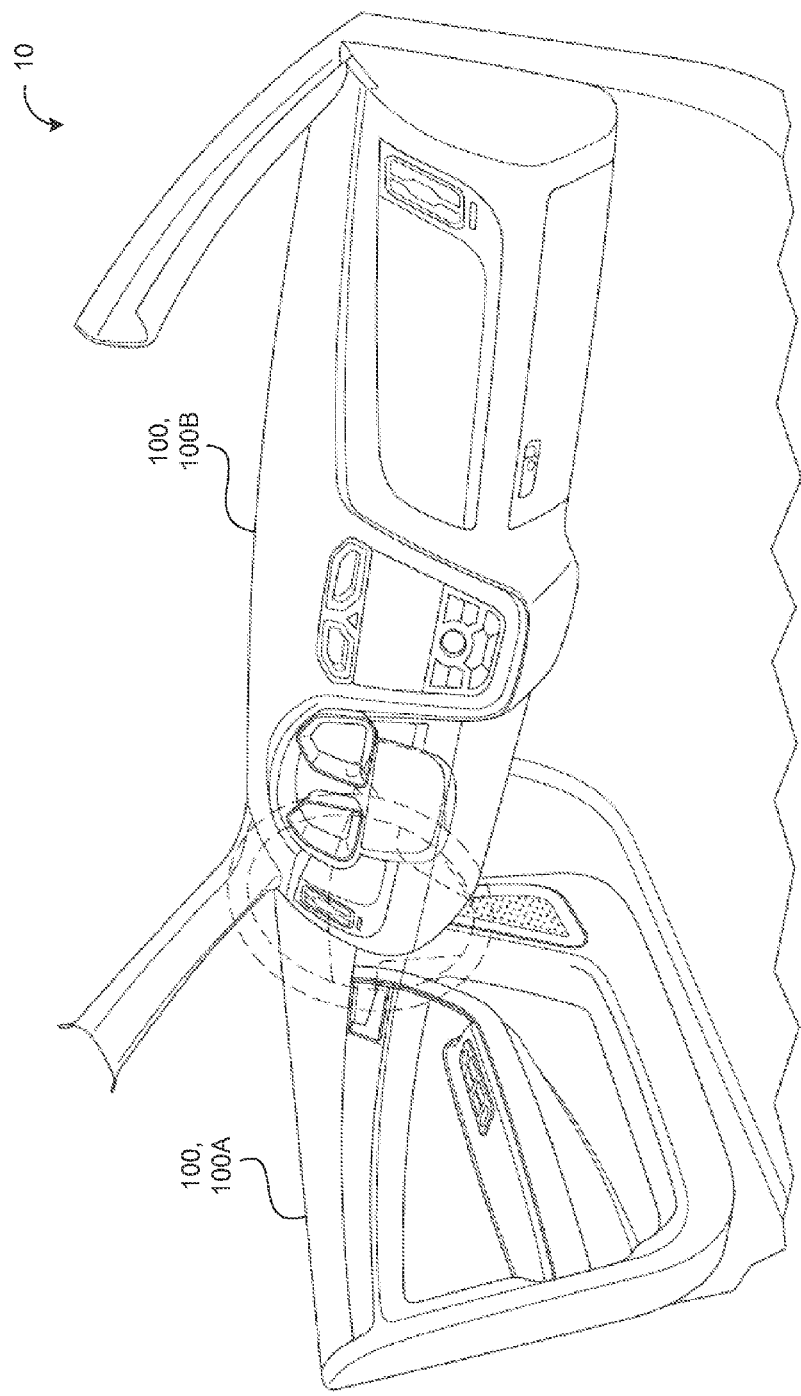
FIG. 1 is a perspective of an exemplary automotive interior having interior automotive panels.

FIG. 1 provides a perspective view of an exemplary automotive interior 10 having interior automotive panels 100, such as an interior door panel 100a and an instrument panel 100b. Interior automotive panels may include multiple material surfaces. The material surfaces can include hard and/or soft surfaces, which may be foam backed or non-foam backed. The present disclosure provides a method of making an interior automotive panel 100 comprised of at least one three-dimensional panel component 110 (see e.g., FIG. 2). The resulting interior automotive panel 100 can have multiple material surfaces, where each panel component 110 can be made of a different material and have a different shape and exterior surface quality. The interior automotive panel 100 may be formed or molded around each panel component 110 into a single mold in a single process. The method provides a process for making a multi-surface automotive panel, without needing several secondary processes to provide multiple surfaces of different material qualities on the finished interior automotive panel 100. The surface qualities can include at least one of material type, hardness, and color.

Figure 2A:
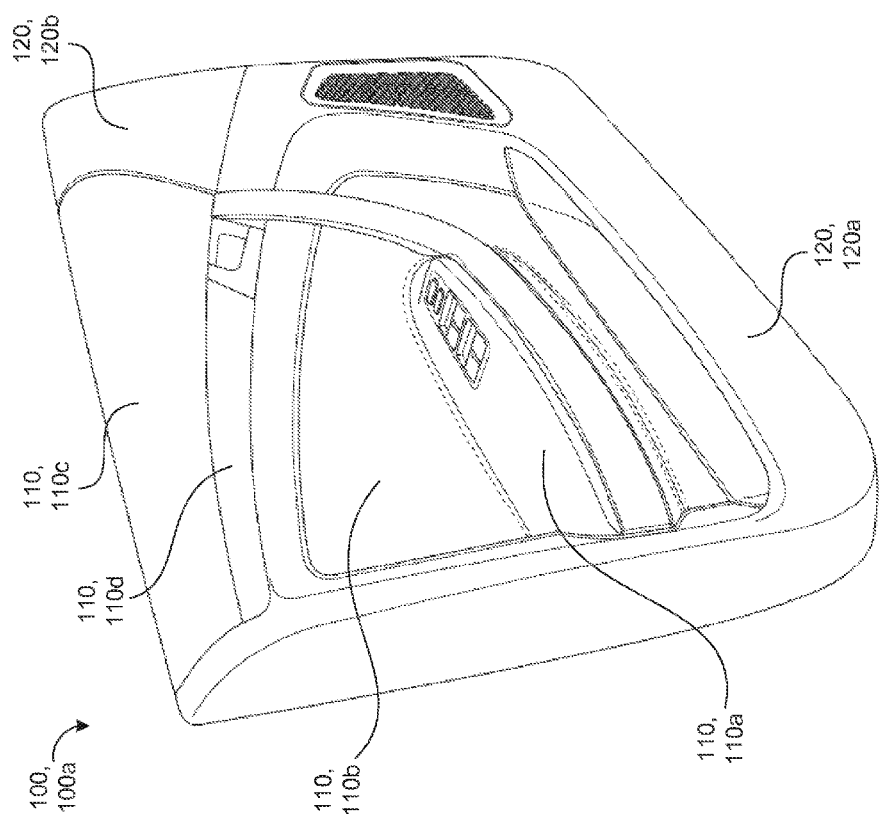
FIG. 2A is a perspective of an exemplary interior automotive door panel.

FIGS. 2A and 2B provide perspective and partially exploded views of the automotive door panel 100a, as an example interior automotive panel 100. The interior automotive door panel 100a includes multiple panel components 110, each having different attributes. The door panel components 110 include an arm rest component 110a (e.g., a vacuum formed component having a switch bank), a first padded component 110b (e.g., a padded trim component having a leather or cloth covering), a second padded component 110c (e.g., a padded trim component having a leather or cloth covering), and a trim component 110d (e.g., a brushed aluminum component). Each panel component 110 has an exterior surface 112 that will be exposed on the formed interior automotive door panel 100. The automotive panel 100 can also include formed or molded components 120 (e.g., components formed during a molding process of the automotive panel 100). In the example shown, the automotive door panel 100a includes a base component 120a (e.g., a hard plastic piece forming a base structure and having exposed exterior surfaces) and an accent component 120b (e.g., a hard plastic component having different qualities (e.g., material, color, etc.) from one of the other formed components 120). The base component 120a is formed around each of the panel components 110, so as to join or integrate each panel component 110 into the interior automotive door panel 100a. In some implementations, at least one molded component 120 is formed integrally attached to the at least one panel component 110. Together the at least one molded component 120 and the at least one panel component 110 define at least a portion of the formed interior automotive panel 100a. The interior automotive panel 100 may also include add-on components 130. In the example shown, the interior automotive door panel 100 includes an attached pocket component 130a as well as an attached handle component 130. The add-on components are attached to the formed interior automotive door panel 100.

The panel components 110 can include three dimensional (3-D) shapes, such as the arm rest component 110a and the first and second padded components 110b, 110c, among others. The panel components 110 may also include substantially two dimensional (2-D) shapes, such as flat cover stocks. In some examples, at least one panel component 110 is vacuum formed with soft upper materials (such as leather or fauxleather with foam backing) Vacuum forming, also known as vacuforming, is a simplified version of thermoforming, whereby a sheet of plastic is heated to a forming temperature, stretched onto or into a single-surface mold, and held against the mold by applying vacuum between the mold surface and the sheet. The panel components are generally formed prior to molding of the interior automotive panel 100 as a whole.

In the example shown in FIGS. 2A and 2B, the arm rest component 110a is a vacuum formed part having a three dimensional shape. The arm rest component 110a includes a soft material (e.g., non-rigid material), such as leather, fauxleather, or some sort of cloth material as an upper material that will eventually become part of the exposed exterior surface of the interior automotive door panel 100a. In the case of the arm rest component 110a, the soft upper material is placed in a vacuum mold along with a foam backing and a plastic forming sheet, which is heated to a forming temperature. After the plastic is pulled into shape by a vacuum and has cooled at least below its forming temperature, the resulting part may be removed from the vacuum mold.

Figure 3:
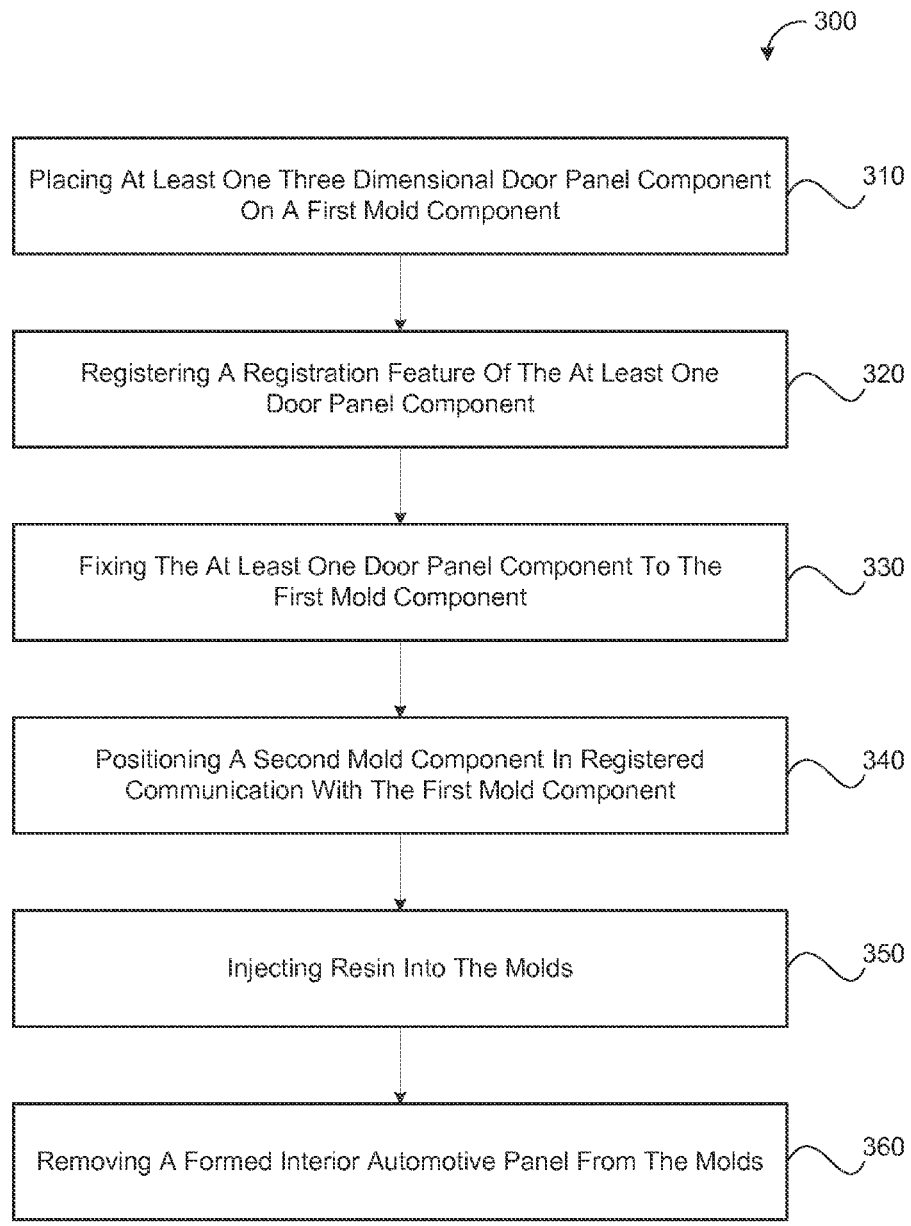
FIG. 3 is a schematic view of an exemplary arrangement of operations for making an interior automotive door panel.
Figure 4:
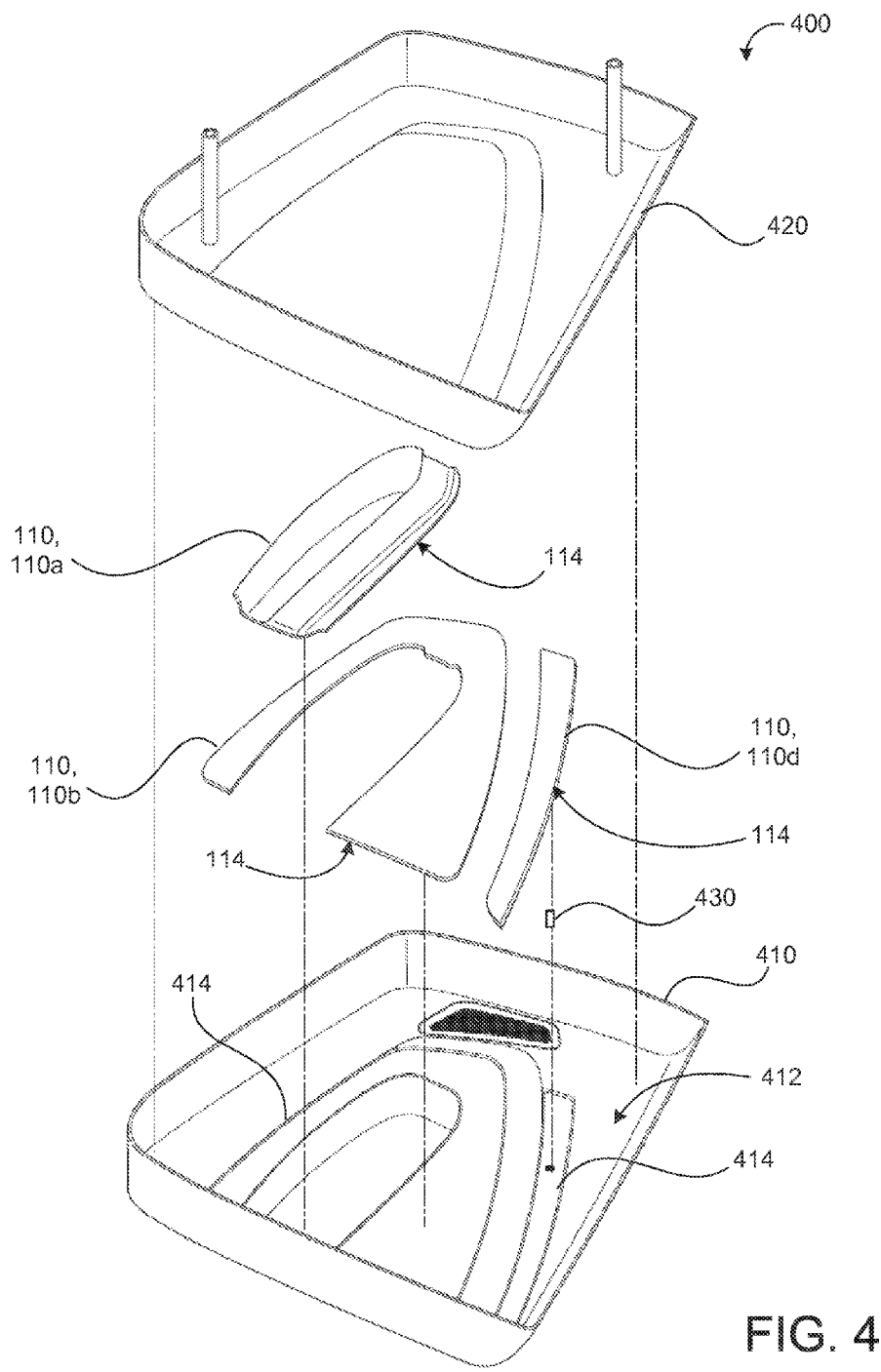
FIG. 4 is a perspective of a molding apparatus receiving panel components of an interior automotive door panel.

FIG. 3 provides an exemplary arrangement 300 of operations for making an interior automotive panel 100. With additional reference to FIG. 4, the operations include placing 310 at least one panel component 110 on a first mold component 410 of a molding apparatus 400. The first mold component 410 has a mold surface 412 shaped to form the exterior surface of the interior automotive panel 100. In the example shown in FIG. 4, the arm rest component 110a, the first and second padded component 110b, 110c and the trim component 110d of the interior automotive door panel 100a are placed onto the mold surface 412 with the exterior surface 112 of each panel component 110 in contact with the mold surface 412 of the first mold component 410.

The operations for making the interior automotive panel 100 also include registering 320 a registration feature 114 of the at least one panel component 110 with a groove or channel 414 defined by the mold surface 412 of the first mold component 410. The registration feature 114 can be merely a delineation between two portions of the panel component 110 (e.g., a transition between first and second surfaces). The registration feature 114 can be an exterior surface perimeter or edge of the panel component 110 that is received by the corresponding groove or channel 414 defined by the mold surface 412 of the first mold component 410. In additional examples, the registration feature 114 of the at least one panel component 110 include registration pins 430 that may be integral with the panel component 110 or removable received by one or both of the panel component 110 and the first mold component 410. Other registration methods may be used as deemed suitable.

The operations for making the interior automotive panel 100 may include fixing or securing 330 the at least one panel component 110 to the mold surface 412 of the first mold component 410. In some implementations, the operations include applying a static charge to each panel component 110 before placing it on the mold surface 412. The static charge causes the door panel component 110 to cling to the first mold component (e.g., via electromagnetism) and is held in place by the static charge during a subsequent injection molding process. In some implementations, the registration feature 114 of the panel component 110 is configured to mate with or be received by the mold surface groove 414 in a manner that at least partially secures the panel component 110 to the mold surface 412. In some examples, one or more of the panel components 110 are adhered to the mold surface 412. An adhesive may be used that either dissipates during injection molding or becomes part of the interior automotive panel 100 in an unobtrusive manner.

After each door panel component is placed in the first mold component 310, the method includes positioning 340 a second mold component 420 of the molding apparatus 400 in registered communication with the first mold component 410.

Together the first and second mold components 410, 420 define a void in the shape of the interior automotive door panel 100.

The operations further include injecting 350 molten resin or plastic (e.g., polypropylene) into the void between the mold components 410, 420 to form the interior automotive door panel 100. High-pressure molding with sequential gating may be employed to control insert position and/or surface defects. The injecting 350 operation may include injecting the resin with a threshold pressure to push the registration feature 114 of the panel component 110 into substantially sealing engagement with the mold surface groove 414. For example, the pressure of the injected molten resin or plastic pushes along a back portion of each panel component 100 to move the panel component 100 against the mold surface 412 of the first mold component 410. Moreover, the injected molten resin or plastic pushes the registration features 114 (e.g., an exterior surface perimeter or edge) of each panel component 110 against the corresponding grooves or channels 414 defined by the mold surface 412 of the first mold component 410. The mold surface grooves or channels 314, in some implementations, are configured to prevent, inhibit, or at least impede flows of molten resin or plastic between the respective panel components 110 and the mold surface 412 of the first mold component. The molten resin or plastic flows around the panel components (except between the panel components 110 and the mold surface 412 of the first mold component) to integrate and join the panel components 110 into a single piece, the interior automotive panel 100.

Once the interior automotive panel 100 has been formed in the molds 410, 420, the operations include removing 360 the formed interior automotive door panel 100 from the first and second mold components 410, 420. The formed interior automotive door panel 100 can have multiple surfaces of different surface qualities as a result of the included panel components 110. In the case of the automotive door panel 100a, the arm rest component 110a, the first padded component 110b, the second padded component 110c, and the trim component 110d each have an exposed exterior surface 112 providing a corresponding surface of the formed interior automotive door panel 100a. The instrument panel 100b can be formed of one or more panel components 110 configured for the instrument panel 100b with the same operations.

The ability to place multiple panel components 110 having different three dimensional shapes into the molding apparatus 400 and form an interior automotive panel 100 allows selective placement of panel components 110 (e.g., components with soft surfaces) in desired areas that will provide the highest consumer value. Furthermore, various foam thickness may be used in various localized areas to create desired panel designs.

A number of implementations have been described. Nevertheless, it will be understood that various modifications may be made without departing from the spirit and scope of the disclosure. Accordingly, other implementations are within the scope of the following claims.

What is claimed is:

1. An assembly, comprising:
 a molded base portion component; and
 at least one preformed three-dimensional panel component having a surface quality unlike the molded base portion component, wherein the molded base portion component is formed around and joined to the at least one preformed three-dimensional panel component for integrating the at least one preformed three-dimensional panel component with the molded base portion component, wherein the molded base portion component is formed around and joined to the at least one preformed three-dimensional panel component utilizing an injection molding process, wherein the molded base portion component and the at least one preformed three-dimensional panel component form an interior automotive panel, wherein the at least one preformed three-dimensional panel component includes:
 a first preformed three-dimensional panel component having a first mold tool registration portion that integrally includes one or more registration pins constructed as one continuous non-separable piece with the first preformed three-dimensional panel component, and
 a second preformed three-dimensional panel component having a second mold tool registration portion,
 wherein the first mold tool registration portion and the second mold tool registration portion are designed to mate with a mold component during the injection molding process, and wherein the injection molding process substantially seals the first mold tool registration portion and the second mold tool registration portion to the mold component.

2. The assembly of claim 1, wherein the first preformed three-dimensional panel component is a vacuum-formed arm rest including a switch bank.

3. The assembly of claim 1, wherein the first preformed three-dimensional panel component is a padded component having a leather or cloth covering.

4. The assembly of claim 1, wherein the second preformed three-dimensional panel component is a brushed aluminum trim component.

5. The assembly of claim 1, wherein the interior automotive panel is an interior door panel.

6. The assembly of claim 1, wherein the interior automotive panel is an instrument panel.

7. The assembly of claim 1, wherein the surface quality of the at least one preformed three-dimensional panel component differs from the molded base portion component in material type, hardness, and color.

8. The assembly of claim 1, wherein the first mold tool registration portion is a delineation between two portions of the first preformed three-dimensional panel component.

9. The assembly of claim 1, wherein the second mold tool registration portion is a delineation between two portions of the second preformed three-dimensional panel component.

10. The assembly of claim 1, wherein the first mold tool registration portion is an exterior surface edge of the first preformed three-dimensional panel component.

11. The assembly of claim 1, wherein the second mold tool registration portion is an exterior surface edge of the second preformed three-dimensional panel component.

12. An assembly, comprising:
 a molded base portion component; and
 at least one preformed three-dimensional panel component having a surface quality unlike the molded base portion component, wherein the molded base portion component is formed around and joined to the at least one preformed three-dimensional panel component for integrating the at least one preformed three-dimensional panel component with the molded base portion component, wherein the molded base portion component is formed around and joined to the at least one preformed three-dimensional panel component utilizing an injection molding process, wherein the molded base portion component and the at least one preformed three-dimensional panel component form an interior automotive panel, wherein the at least one preformed three-dimensional panel component includes:

a first preformed three-dimensional panel component having a first mold tool registration portion, and a second preformed three-dimensional panel component having a second mold tool registration portion that integrally includes one or more registration pins constructed as one continuous non-separable piece with the second preformed three-dimensional panel component, wherein the first mold tool registration portion and the second mold tool registration portion are designed to mate with a mold component during the injection molding process, and wherein the injection molding process substantially seals the first mold tool registration portion and the second mold tool registration portion to the mold component.

13. The assembly of claim 12, wherein the second preformed three-dimensional panel component is a brushed aluminum trim component.

14. The assembly of claim 1, wherein the one or more registration pins are removably-received within a pin-receiving recess formed by the second preformed three-dimensional panel component.

15. The assembly of claim 14, wherein the second preformed three-dimensional panel component is a brushed aluminum trim component.

16. The assembly of claim 1, wherein the surface quality of the at least one preformed three-dimensional panel component differs from the molded base portion component in one or more of
material type,
hardness, and
color.

17. An assembly, comprising:
a base portion component formed within an injection molding apparatus; and
at least one preformed three-dimensional panel component having a surface quality unlike the base portion component and at least one registration pin, the at least one registration pin is:
received by the injection molding apparatus during the formation of the base portion component,
integrally formed with the at least one preformed three-dimensional panel component, and
constructed as one continuous non-separable piece with the at least one preformed three-dimensional panel component,
wherein the injection molding apparatus comprises a surface shaped to form a first surface of the assembly, wherein the formation of the base portion component within the injection molding apparatus integrates the base portion component and the at least one preformed three-dimensional panel component, wherein the at least one preformed three-dimensional panel component fixes to the surface of the injection molding apparatus during the formation of the base portion component.

18. The assembly of claim 17, wherein the base portion component and the at least one preformed three-dimensional panel component form an interior automotive panel.

19. The assembly of claim 18, wherein the first surface of the assembly comprises an exterior surface of the interior automotive panel.

20. The assembly of claim 17, wherein the at least one preformed three-dimensional panel component comprises at least one non-corner registration feature.

21. The assembly of claim 20, wherein the at least one registration feature mates with a corresponding registration feature associated with the injection molding apparatus during the formation of the base portion component.

22. The assembly of claim 21, wherein the at least one registration feature substantially seals to the corresponding registration feature during the formation of the base portion component.

23. The assembly of claim 17, further comprising at least one depression formed into the at least one preformed three-dimensional panel component, and wherein the at least one depression receives at least one registration pin during the formation of the base portion component.

24. The assembly of claim 17, wherein a static charge is applied to the at least one preformed three-dimensional panel component to accomplish the fixing the at least one preformed three-dimensional panel component to the surface of the injection molding apparatus during the formation of the base portion component.

25. The assembly of claim 1, wherein the first and second mold tool registration portions are non-corners.

26. The assembly of claim 8, wherein the delineation is a transition between a first surface of the first preformed three-dimensional panel component and a second surface of the first preformed three-dimensional panel component, and wherein the first and second surfaces are substantially parallel to the mold component.

27. The assembly of claim 9, wherein the delineation is a transition between a first surface of the second preformed three-dimensional panel component and a second surface of the second preformed three-dimensional panel component, and wherein the first and second surfaces are substantially parallel to the mold component.

28. The assembly of claim 19, wherein a first mold component forms the surface shaped to form a first surface of the assembly; and wherein the first mold component comprises a bottom component of the molding apparatus.

* * * * *